(12) United States Patent
Doster et al.

(10) Patent No.: US 12,162,660 B1
(45) Date of Patent: Dec. 10, 2024

(54) CONTAINMENT WITH INTERNAL SEAL AND METHOD FOR MANUFACTURE THEREOF

(71) Applicant: Double Double D, LLC, Burlington, KY (US)

(72) Inventors: Daniel G. Doster, Waynesville, OH (US); Jim F. Warner, Chicago, IL (US)

(73) Assignee: Double Double D, LLC, Waynesville, OH (US)

(*) Notice: Subject to any disclaimer, the term of this patent is extended or adjusted under 35 U.S.C. 154(b) by 267 days.

(21) Appl. No.: 17/326,824

(22) Filed: May 21, 2021

Related U.S. Application Data

(60) Provisional application No. 63/028,802, filed on May 22, 2020.

(51) Int. Cl.
| | |
|---|---|
| *B65D 65/46* | (2006.01) |
| *B65D 23/02* | (2006.01) |
| *B65D 43/02* | (2006.01) |
| *B65D 53/00* | (2006.01) |
| *C09D 7/20* | (2018.01) |

(Continued)

(52) U.S. Cl.
CPC ........... *B65D 65/466* (2013.01); *B65D 23/02* (2013.01); *B65D 43/0231* (2013.01); *B65D 53/00* (2013.01); *C09D 7/20* (2018.01); *C09D 7/61* (2018.01); *C09D 7/67* (2018.01); *C09D 167/02* (2013.01); *C09D 167/04* (2013.01); *C09D 197/005* (2013.01)

(58) Field of Classification Search
CPC ...... B65D 1/0223; B65D 1/02; B65D 65/466; B65D 23/02; B65D 43/0231; B65D 53/00; B65D 53/04; C09D 7/67; C09D 7/61; C09D 7/20; C09D 167/02; C09D 167/04; C09D 197/005
USPC ....... 215/379, 341; 220/678, 681, 691, 4.06, 220/4.24
See application file for complete search history.

(56) References Cited

U.S. PATENT DOCUMENTS

| | | | | | |
|---|---|---|---|---|---|
| 3,092,277 | A | * | 6/1963 | Brim | B65D 81/3879 220/4.24 |
| 5,823,391 | A | * | 10/1998 | Klauke | B65D 35/22 220/4.27 |

(Continued)

FOREIGN PATENT DOCUMENTS

| | | | | | |
|---|---|---|---|---|---|
| CN | 104540995 | A | * | 4/2015 | ............. B65D 65/42 |
| CN | 105517776 | A | * | 4/2016 | ............. B29C 49/12 |
| KR | 20100004811 | U | * | 5/2010 | |

OTHER PUBLICATIONS

USPTO Communication; Non-Final Office Action, dated May 22, 2024, received in corresponding U.S. Appl. No. 18/159,478.

*Primary Examiner* — J. Gregory Pickett
*Assistant Examiner* — Niki M Eloshway
(74) *Attorney, Agent, or Firm* — Dinsmore & Shohl LLP

(57) ABSTRACT

The present disclosure concerns a containment of pulp material that reduces reliance on adhesives and polymers. The containment is of two preformed semi-cylinders that linked together by using a preformed raised ridge that slots into a trough on the opposing half. The containment may optionally include a biopolymer based internal layer to provide a sealed containment. The present disclosure also concerns a cap for the containment with a narrowed wall and a recess to retain a lid liner with notched walls that allow for expansion at the closed end.

18 Claims, 5 Drawing Sheets

(51) Int. Cl.
*C09D 7/40* (2018.01)
*C09D 7/61* (2018.01)
*C09D 167/02* (2006.01)
*C09D 167/04* (2006.01)
*C09D 197/00* (2006.01)

(56) References Cited

U.S. PATENT DOCUMENTS

| | | | |
|---|---|---|---|
| 9,090,372 B2 | 7/2015 | Warner | |
| 10,035,621 B2 | 7/2018 | Warner | |
| 10,582,786 B1* | 3/2020 | Saint Geours | B65D 47/265 |
| 2007/0029275 A1* | 2/2007 | Hantman | B65D 81/3288 |
| | | | 222/129 |
| 2011/0091672 A1 | 4/2011 | Patel | |
| 2011/0223401 A1 | 6/2011 | Teknillinen | |
| 2014/0252032 A1* | 9/2014 | Corbett | B65D 11/06 |
| | | | 222/105 |
| 2015/0284143 A1* | 10/2015 | Herisson | B05B 11/0008 |
| | | | 220/4.24 |
| 2015/0308050 A1 | 10/2015 | Corbett et al. | |
| 2020/0062475 A1* | 2/2020 | Warner | B65D 39/088 |

* cited by examiner

CONTAINMENT WITH INTERNAL SEAL AND METHOD FOR MANUFACTURE THEREOF

RELATED APPLICATIONS

This application claims priority to U.S. Provisional Patent Application No. 63/028,802, filed May 22, 2020, the contents of which is hereby incorporated by reference in its entirety.

FIELD

The present invention relates to containments and in particular, to containments with an internal seal.

TECHNICAL BACKGROUND

As space for landfills become scarce and wasted plastics amass, companies engaged in providing collected loose materials as a product are increasing their desire to employ containments that rely less on polymers and can be easily re-used, re-cycled, or degraded.

SUMMARY

The aspects of the present disclosure described herein provide an ecologically friendly containment that is made of ecologically friendly materials. Such materials may include agricultural processing materials, such as forms of bamboo, banana leaves, hay, grasses, cornstalks, etc. Some aspects may include post-consumer waste, such as newsprint, packaging, other forms of paper products, etc. Some aspects include composite materials, such as from landfill and/or municipal reclaim centers, including architectural wood, building materials, manufacturing byproducts, etc. One or more other ecologically friendly materials may be used, depending on the particular embodiment.

In some aspects, the present disclosure concerns containments or containers that include two similar essentially semi cylindrical parts affixed together at two seams to form a complete containment for the convenience of collecting and enclosing a collection of small items, such as pills or medicaments.

The two semi-cylindrical parts are of a uniform thickness or near uniform thickness throughout the semi-circular cross-sectional area and along the length of the semi-cylindrical body, with the two parts unifying through a seam area that extends along the length of the semi-cylindrical body at the two ends of each semi-circular shape as defined by a cross-sectional or aerial view. The seam area of each half parts is typically wider than the wall of the rest of the assembled containment to allow for a raised ridge portion to slot into a trough. Each half of the containment features a raised ridge or series of such on one side and trough or series of such on the other, such that when in contact with an identical copy, the raised ridges align inside the troughs and the seam of the containment is created. Each trough may be slightly deeper and wider than the respective ridge that fits therein to allow for a loose fit. This then allows volume within each pieced together raised ridge-trough for an adhesive or sealant.

The containment also features an inserted neck piece with an exterior thread and a cap. The neck can be retained within the containment through a vertical rim on the body of the containment fitting inside a respective groove at the base of the neck piece. The cap can be a polymer cap with internal grooves to match the thread of the neck. Alternatively, the cap may be a pop off cap. The pop off cap may feature a recess at its closed end for receiving a lid liner, with notches in the side wall of the lid liner allowing for both bending of the lid liner to reach the recess and to expand therein and be retained against the closed end. The pop off cap may additionally feature curves to grip the exterior thread of the neck piece to improve fit and cap retention on the containment.

In some aspects, the present disclosure concerns a containment that includes first and second essentially identical semi-cylindrical parts each with a curved body and a first length edge and a second length edge. In some aspects, the first length edge includes a raised ridge extending along a portion of the first length edge and the second length edge includes a trough extending along a portion of the second length edge. In further aspects, the portion of the second length edge is positioned opposite the portion of the first length edge. In even further aspects, the trough is essentially a relief of the raised ridge that allows the two essentially identical semi-cylindrical halves to join to form the containment by placing the raised ridge and trough of the first semi-cylindrical part in the trough and raised ridge of the second semi-cylindrical part.

In some aspects, an adhesive or sealant may be used in the trough.

In further aspects, the first and the second semi-cylindrical parts may further include a semi-circular distal end positioned such that a circular flat bottom is formed. In some aspects, a raised ridge may also extend along a portion of the diameter of the semi-circular distal end of the first semi-cylindrical half and a trough may extend along a portion of the diameter of the semi-circular distal end of the second semi-cylindrical part.

In further aspects, the first length edge may include at least two raised ridges. In other aspects, the first length edge may include a trough that extends along a second portion of the first length edge.

In some aspects, the containment may also include a cap. In further aspects, the cap may include an opening to receive a proximal end of the containment, a closed end, and a cylindrical wall. In certain aspects, the cylindrical wall connects the opening and the closed end and the cylindrical wall thickness narrows toward the closed end to provide a recess. In further aspects, the cap may include a lid liner inserted into the recess of the cap, the lid liner including notched sidewalls and a roof to be flush against the closed end when inserted. In certain aspects, the cap may also include curved ridges around the interior circumference of the cylindrical wall.

In some aspects, the first and second essentially identical semi-cylindrical parts are of a pulp material.

In further aspects, the containment may also include an internal liner. The internal liner may be of a biopolymer selected from polyhydroxyalkanoate, (PHA) polybutylene succinate (PBS), lignin, or a mixture of two or more thereof. In some aspects, the biopolymer may have been dispersed in a solvent such as dichloromethane, dichlorodimethylsilane, hydrofluoroether, or a mixture of two or more thereof. In some aspects, the internal liner may further include nanoparticles selected from hydrophobic nanoparticles, silicone dioxide nanoparticles, zinc oxide nanoparticles or a combinations thereof.

In some aspects, the present disclosure concerns a method of preparing a containment, by preforming two essentially identical semi-cylindrical parts, each with a curved body and a first length edge and a second length edge. In some aspects, the first length edge includes a raised ridge that extends along a portion of the first length edge and the second length edge includes a trough that extends along a portion of the second length edge, with the portion of the second length edge being positioned opposite the portion of the first length edge. In further aspects, the method may also include aligning the first length edge of the first semi-cylindrical part with the second length edge of the second semi-cylindrical part and the second length edge of the first semi-cylindrical part with the first length edge of the second semi-cylindrical part and then inserting the raised ridge on the first length edge into the trough on the second length edge to form the containment.

In some aspects, the method may also include including an adhesive or sealant in the trough of the second length edge.

In further aspects, the first and the second semi-cylindrical parts may further include a semi-circular distal end portion to provide a circular bottom following alignment and/or a biopolymer internal layer in the containment. In certain aspects, the internal layer may be inserted by applying a solvent with the biopolymer dispersed therein to surfaces within the containment.

DETAILED DESCRIPTION

Figure 1:
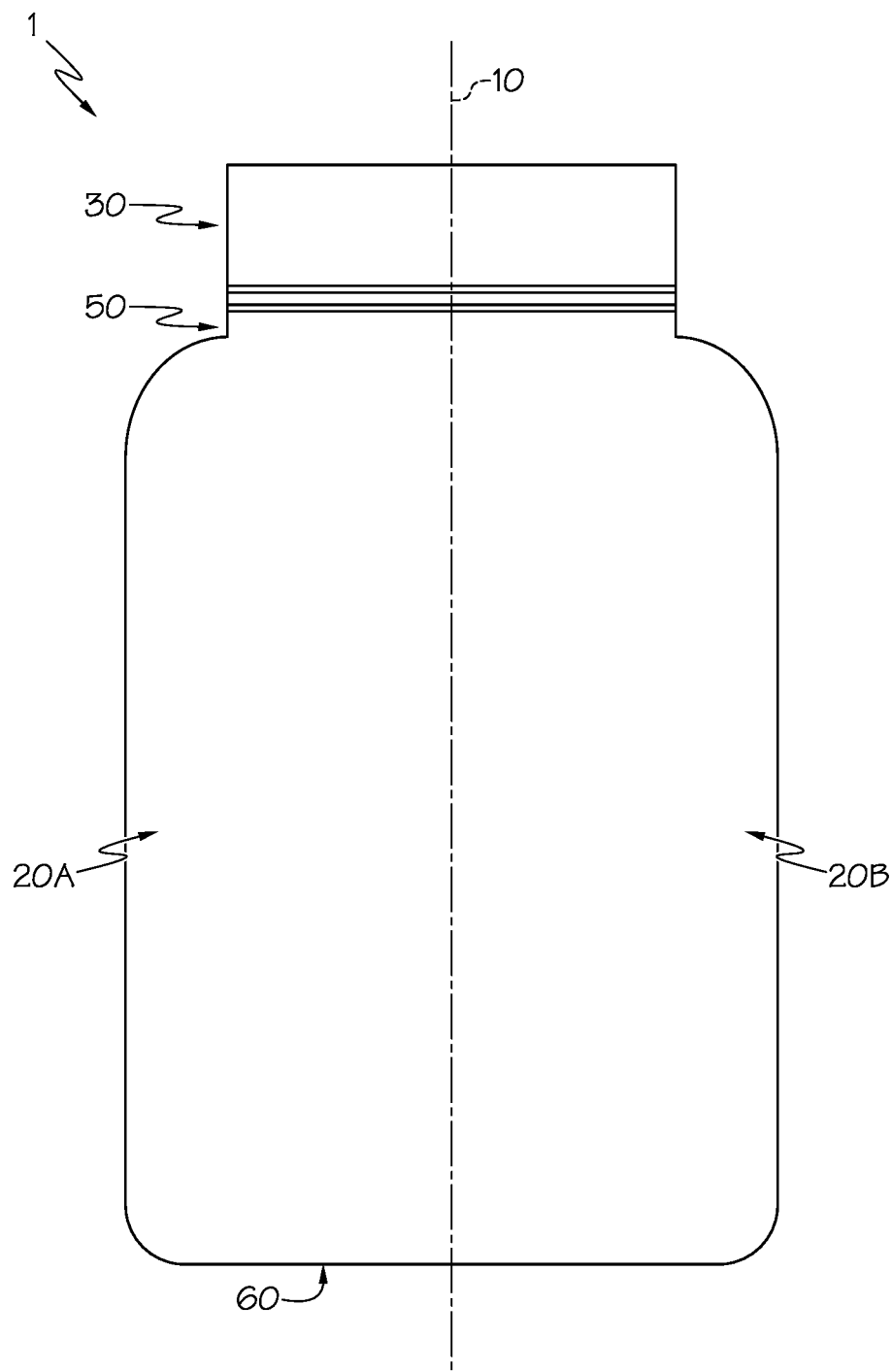
FIG. 1 depicts a side profile of the containment, according to aspects described herein.

The present disclosure concerns a containment or container formed from two essentially semi-cylindrical halves joined together at a seam. In some aspects, both essentially semi-cylindrical halves may be constructed from a pulp material (see, e.g., U.S. Pat. Nos. 9,090,372 and 10,035,621, incorporated by reference herein in their entireties). Such materials may include agricultural processing materials, such as forms of bamboo, banana leaves, palm leaf, paper, lignins, hay, grasses, cornstalks, hemp, sugarcane (bagasse), wheat straw, hay, pulp including recycled pulp, fiber materials, and/or the like. In some aspects the materials may include post-consumer waste, such as newsprint, packaging, other forms of paper products, etc. In some aspects, the materials may include composite materials, such as from landfill and/or municipal reclaim centers, including architectural wood, building materials, manufacturing byproducts, etc. One or more other pulp materials may be used, depending on the particular desired properties from the finished containment or container.

In some aspects, the containment or container may further include one or more internal liners. Such may be introduced to increase water tightness or to establish a sealed internal space within the containment or container. Exemplary materials for such include biopolymers, lignin, polyethylene terephthalate (PET) and its copolyesters, polyether block amides (e.g., PEBAX), nylons, polyurethanes, polyethylenes (e.g., high density polyethylenes (HDPE), ultra-high-molecular-weight polyethylenes (UHWPE), low density polyethylenes (LDPE), or any combination thereof), biaxially-oriented polyethylene terephthalates (e.g., mylar), and other polymers and thermoplastic polymers, fabrics, silicones such as silicone rubber, latex, glass, or other materials now known or later developed. The internal liner may further include a thin deposit of hydrophobic, silicon dioxide and/or zinc oxide nanoparticles. In some aspects, a biopolymer may be applied directly to the interior surface of the assembled containment. In further aspects a deposit of nanoparticles may then be applied directly to the biopolymer. In some aspects, the biopolymer and nanoparticles are included in a combined layer that can be applied directly to an interior surface of the assembled containment. Similarly, some aspects may be configured with the biopolymer being dispersed in a solvent, the solvent including dichloromethane (DCM), dichlorodimethylsilane (DCMS), hydrofluoroether, or a mixture of two or more thereof. The biopolymer and the nanoparticles may be included a combined layer, such as a pre-layered film or a liquid mixture, and applied to assembled containment in a single application. A pre-layered film including the biopolymer and the nanoparticles may be applied to an interior surface of the assembled containment. A liquid mixture may include the nanomaterial mixed in liquid form with the biopolymer and applied to the interior of the assembled two essentially identical semi-cylindrical halves. The pre-layered film or liquid mixture may include a biopolymer, a solvent, and a nanomaterial as described herein. The biopolymer, solvent, and nanomaterials may be present in the pre-layered film or liquid mixture in varying concentrations to achieve the desired properties.

In some aspects, the present disclosure concerns a containment or container formed by the union or piecing together of the essentially identical two semi-cylindrical halves. In some aspects, the semi-cylindrical halves or parts are of a curved body with two defined length edges that extend along the each exposed length of the semi-cylindrical body. As further set for therein, along the length edges of each essentially semi-cylindrical half are parts to connect the two halves and provide a seam. In some aspects the length edges include troughs and raised ridges, wherein a trough at one position along a length edge requires a proportional raised ridge at the same point on the opposing length edge. Along one edge length of each essentially identical semi-cylindrical half is a raised ridge portion or series of raised ridge portions and along the other edge length is a trough or series of troughs, wherein the length of each raised portion corresponds to the length of each trough on the opposing edge length and the height of each raised portion corresponds to the depth of each trough on the opposing length edge. Accordingly, by providing each essentially identical semi-cylindrical half with a length edge of raised ridge(s) and length edge of trough(s), the raised ridges can insert into the troughs on the opposing identical semi-cylindrical half to form the containment. In some aspects, each trough along the length edge is a relief or essentially a relief of each raised ridge at the same location along the opposing length edge.

In some aspects, the raised ridges and troughs need not each be confined to separate length edges, but instead can alternate or adopt any preferred pattern, so long as the opposing piece is present at the corresponding point or position on the opposing length edge. In some aspects, the thickness of each essentially identical semi-cylindrical half is increased along the length edges to provide more material for where the two essentially identical semi-cylindrical halves join. In further aspects, as the trough-ridge junction becomes internal to the walls of the formed cylindrical containment, an adhesive or sealant may be included to strengthen the points of junction.

In some aspects, the raised ridge portions need to provide a fit with the trough portions. In further aspects, the trough is a relief or essentially a relief of the shape of the raised ridge. In some aspects, the raised portions may be of the same or essentially the same height and length as that of the opposing depth and length in the trough portion. In other aspects, the raised ridge portion may be of the same or essentially the same width as the opposing trough. In other aspects, the width of the raised ridge portion may be slightly wider to provide for an outward force when placed in the trough. In other aspects, the raised ridge may be of a slightly less width and/or height and/or length than that of the width and/or depth and/or length of the opposing trough. In some aspects, the trough may provide a larger volume in relief of the raised ridge to be received such that when inserted in the trough to provide space for the inclusion of an adhesive or sealant.

In some aspects of the present disclosure, each of the two essentially identical semi-cylindrical halves include at least one end piece at a proximal and/or distal end of each shape. For example, including a semi-circular end piece at an end distal from the top of the containment that is essentially perpendicular to the semi-cylinder walls and matching or essentially matching the radius of the assembled cylinders allows for the formation of a flat solid bottom or base to the containment when essentially identical the semi-cylindrical halves are joined. Similarly, including a half of a desired top shape, such as a taper or semi-conical part, at the end of each semi-cylindrical half cylinder desired to be the top of the containment allows for the formation of a desired lid or opening to the containment when the two essentially identical semi-cylindrical halves are joined.

The two semi-cylindrical halves of the containment may be manufactured by methods known in the art, such as blow molding or injection molding. The two halves are essentially identical and can be pieced together to form an enclosed containment. In some aspects, the containment can be formed by aligning the first length edge of the first semi-cylindrical part with the second length edge of the second semi-cylindrical part and the second length edge of the first semi-cylindrical part with the first length edge of the second semi-cylindrical part and inserting the raised ridge on the first length edge into the trough on the second length edge to form the containment. It will be also appreciated that while the two halves are described herein as being essentially identical and being semi-cylindrical, the pieces need not be limited in shape or uniformity. It will be appreciated that the containment can be formed in any desired shape as long the two hales or parts to be joined have aligning length edges that allow for raised ridges to pair up with respective troughs on the opposing half or part to form the containment.

With respect to the drawings, FIG. 1 shows a side view of an assembled containment 1, with a seam 10, the exterior of which is visible thereby illustrating the union of two essentially semi-cylindrical halves 20A, 20B. Further depicted is a cap 30 for the assembled containment 1. The two essentially semi-cylindrical halves 20A, 20B may be constructed of an environmentally friendly, recyclable, degradable (such as biodegradable, compostable, solar degradable, polymer or non-polymer material, and/or other eco-friendly material) material. The two essentially semi-cylindrical halves 20A, 20B may be constructed of an organic or organic-based material. The two essentially semi-cylindrical halves 20A, 20B may be constructed of a pulp material. The two essentially semi-cylindrical halves 20A, 20B may be constructed of wood by-products (including paper), bamboo, hemp, bagasse, or a mixture of two or more thereof. The two essentially semi-cylindrical halves 20A, 20B may be formed to define the desired size and/or shape for the containment 1. The two essentially semi-cylindrical halves 20A, 20B may have a thickness to achieve the desired structural integrity, rigidity, thermal properties, and insulating properties for the particular application. Each of the two essentially semi-cylindrical halves 20A, 20B further feature a flat bottom 60 and optional taper to receive a neck 50 inserted at the top of the assembled containment 1. As depicted in FIG. 1, the presence of a semi-circular shape at the distal ends of the semi-cylindrical halves 20A, 20B allows the flat bottom 60 to form.

Figure 2:
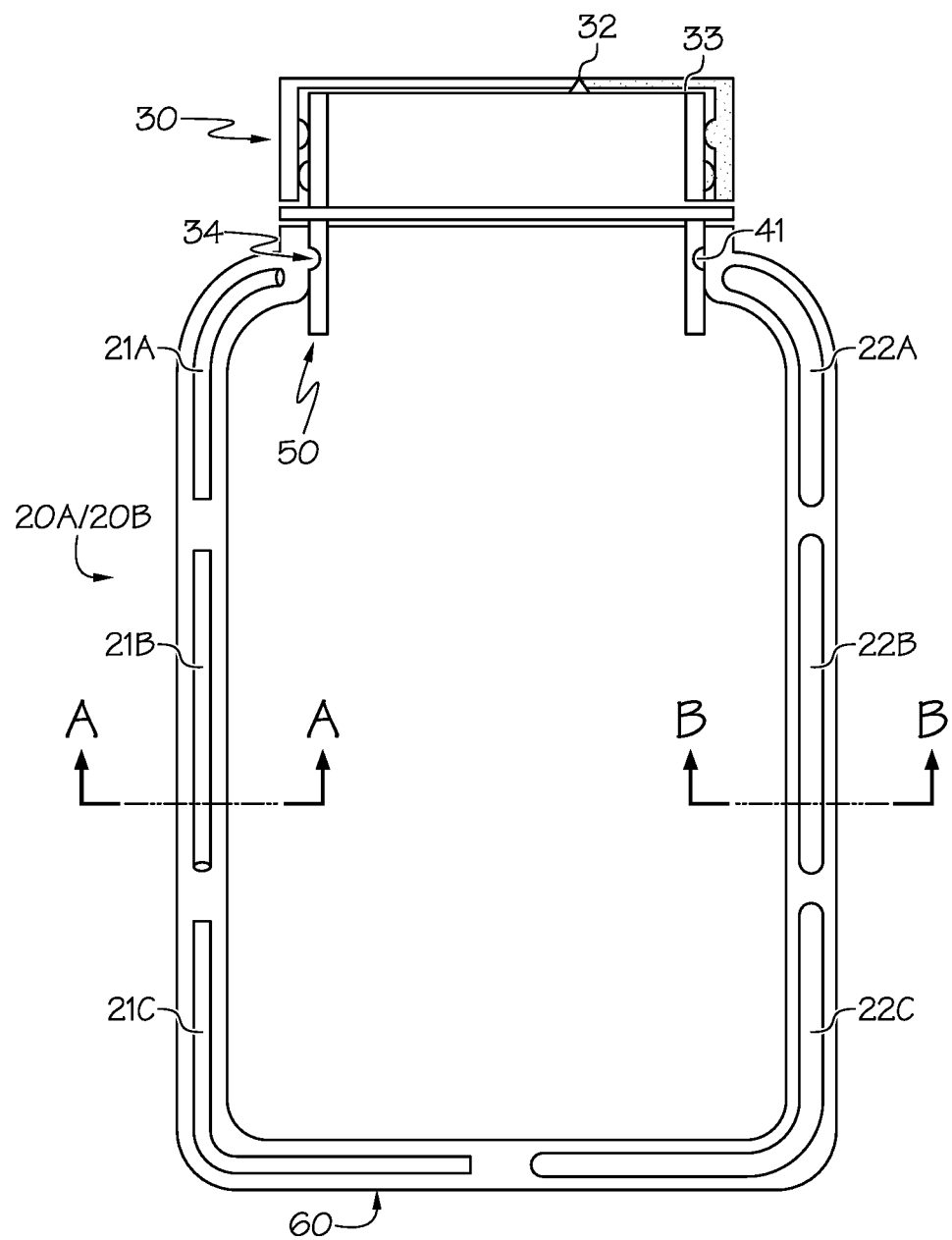
FIG. 2 depicts a cross-sectional view of the containment with the seam of the containment visible, according to aspects described herein.

FIG. 2 shows a side view of one-half of the two essentially semi-cylindrical halves 20A or 20B with the other detached and rotated about ninety degrees From FIG. 1, such that the interior of the seam 10 is visible. As depicted, the seam 10 comprises three raised ridge lengths 21A, 21B and 21C that mirror in length three trough lengths 22A, 22B, 22C on the opposing half. In some aspects, the shape of the trough lengths 22A, 22B, 22C are a relief or essentially a relief of the shape of the raised ridge lengths 21A, 21B, 21C. When combined with an opposing essentially identical semi-cylindrical half 20B or 20A, 21A and 22A along with 21B and 22B along with 21C and 22C fit together to form the seal of the seam 10 of the assembled containment 1. It will be understood in the art that the number of raised ridge and respective trough lengths can vary as long as each is similar in length. In some aspects, an adhesive or sealant may further be applied between the raised ridge and trough segments. As further depicted in FIG. 2, the raised ridge lengths 21C can extend of be incorporated into those parts of the two essentially semi-cylindrical halves 20A or 20B that form the flat bottom 60. In some aspects, a raised ridge length 21C or a trough length 22C may extend along a portion of the diameter of the semi-circular shapes at the distal end or flat bottom 60 of the containment to provide for further points of connection and linkage between the two essentially identical semi-cylindrical halves 20A, 20B.

At the top of the assembled containment 1 is an opening 40 to receive a neck 50 that is preformed to allow for a cap 30 to be placed on the assembled containment 1. Each of the two essentially identical semi-cylindrical halves 20A, 20B has a vertical rim 41 preformed thereon near the opening 40. The vertical rim 41 can engage with a corresponding indenture 34 around the circumference of the neck 50 in order to hold the neck in place once the two essentially identical semi-cylindrical halves 20A, 20B are brought together by the union of 21A and 22A along with 21B and 22B along with 21C and 22C to form the seam 10.

Further depicted in FIG. 2 is a partial cross-sectional view of a cap 32 for the assembled containment 1. The cap 32 can be of a polymer material 31 and affixed by twisting the cap 32 down an angled thread on exterior of the neck 50 (thread not explicitly depicted in FIG. 2). In some embodiments, the cap 32 may be a cap 32 that pops off of a similar or identical pulp material with a lid liner 33 placed therein for an improved seal when closed. The lid liner 33 may comprise a flexible polymer film, such as a vacuum induced film.

Those skilled in the art will appreciate that although not explicitly depicted in FIG. 2, other cap mechanisms can be included with the assembled containment 1, such as including a push and turn mechanism with the cap 32 to childproof the contents of the assembled containment 1.

Figure 3:
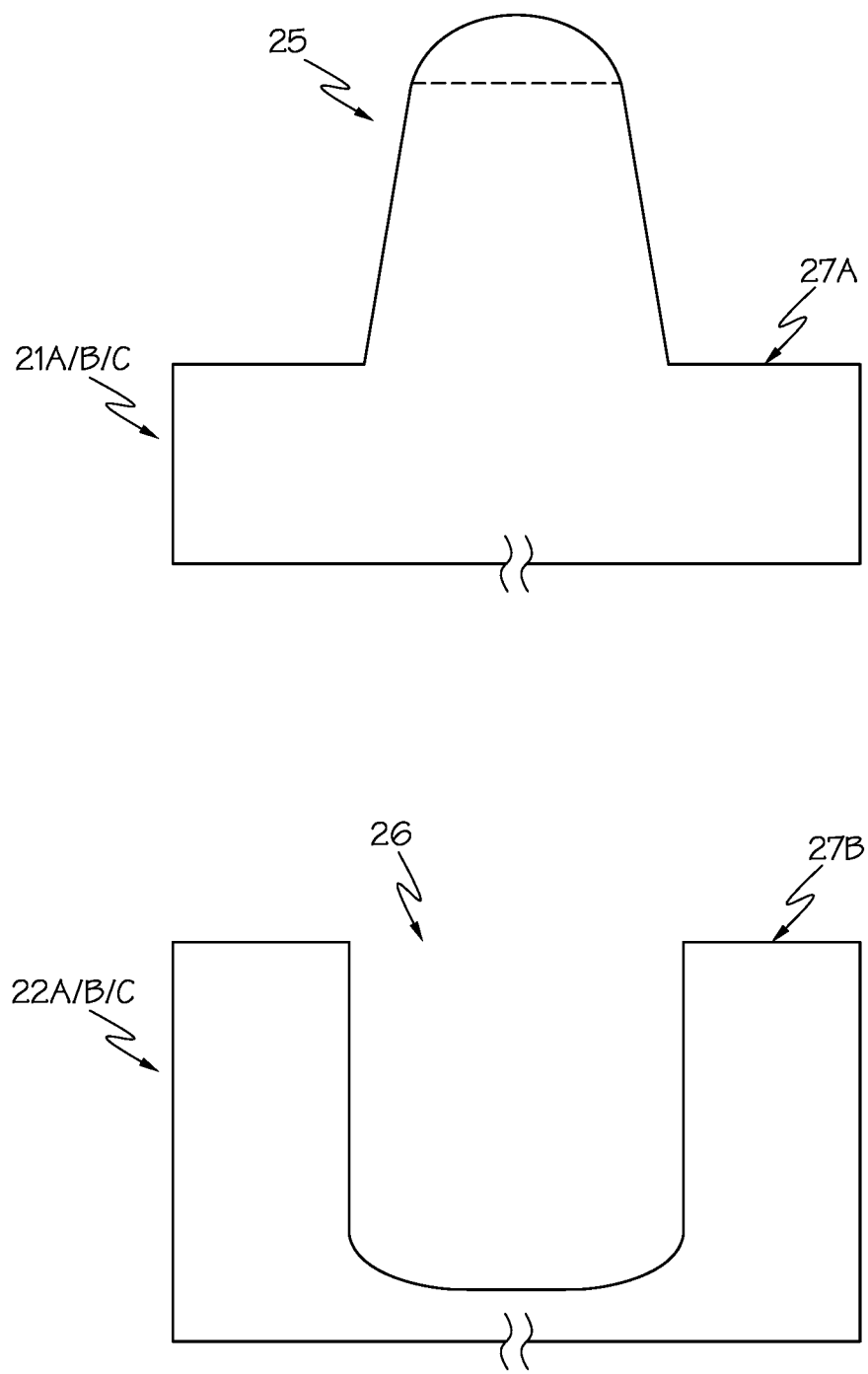
FIG. 3 depicts an enlarged view of the two functional aspects of the seam for holding the two halves of the containment together, according to aspects described herein.

Turning to FIG. 3, a cross section of both the raised ridge 25 and the trough 26 are depicted. The raised ridge 25 is slightly narrower in width and lower in height than the respective width and depth of the trough 26. Further, the width of the raised ridge 25 and the width of the trough 26 as they relate to the width of the wall of each of the two essentially semi-cylindrical halves 20A, 20B are narrower, leaving planar sections length edges 27A, 27B, such that when the two essentially semi-cylindrical halves 20A, 20B are united to form the seam 10, the two essentially semi-cylindrical halves 20A 20B appear to be in planar contact and the union of the raised ridge 25 and the trough 26 are not observed externally.

Figure 4:
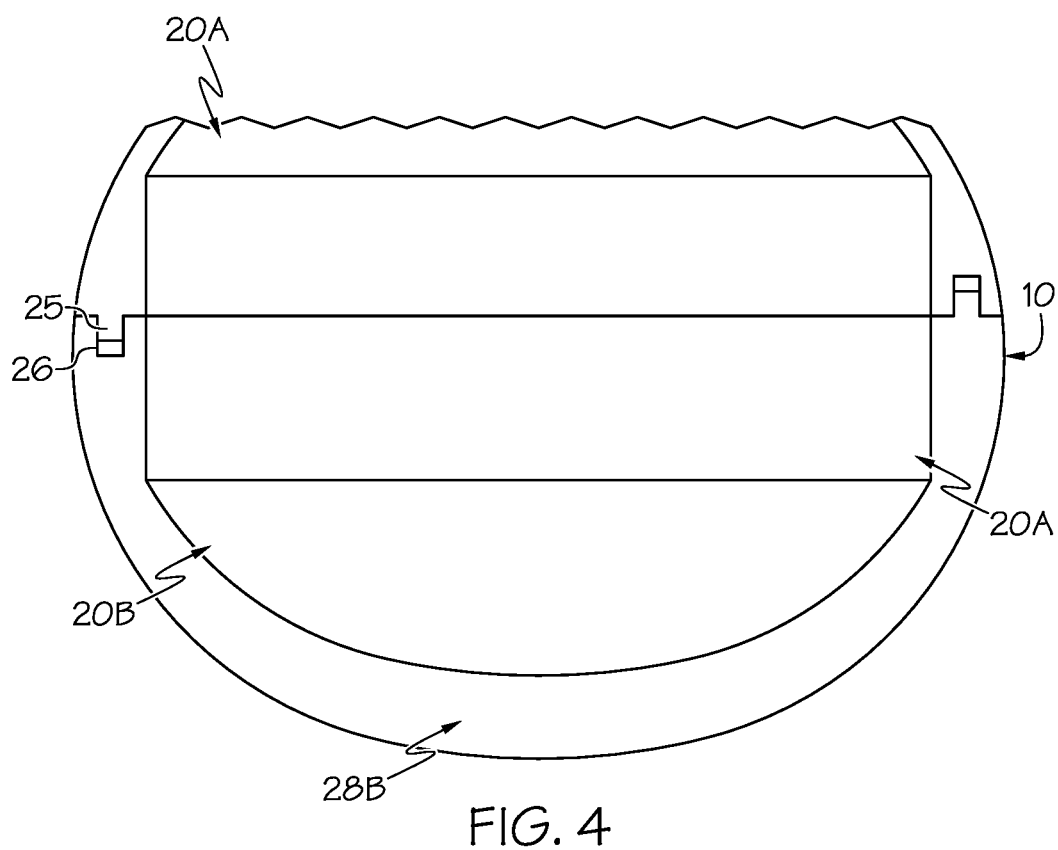
FIG. 4 depicts a partial top-down view of the containment, according to aspects described herein.

Turning to FIG. 4, seen is an aerial cross section of the two essentially semi-cylindrical halves 20A, 20B in contact to form the seam 10 through the fitting of the raised ridge 25 from one of the two essentially semi-cylindrical halves 20A into the trough 26 on the opposing essentially identical semi-cylindrical half 20B. FIG. 4 further illustrates that the wall thickness 28A of each of the two essentially semi-cylindrical halves 20A, 20B is optionally wider at the seam 10 than the thickness 28B otherwise throughout. The optional increased thickness allows for the containment to be formed with excess materials but still retain sufficient contact area for the seam 10 to effectively hold the two essentially semi-cylindrical halves 20A, 20B together.

Figure 5:
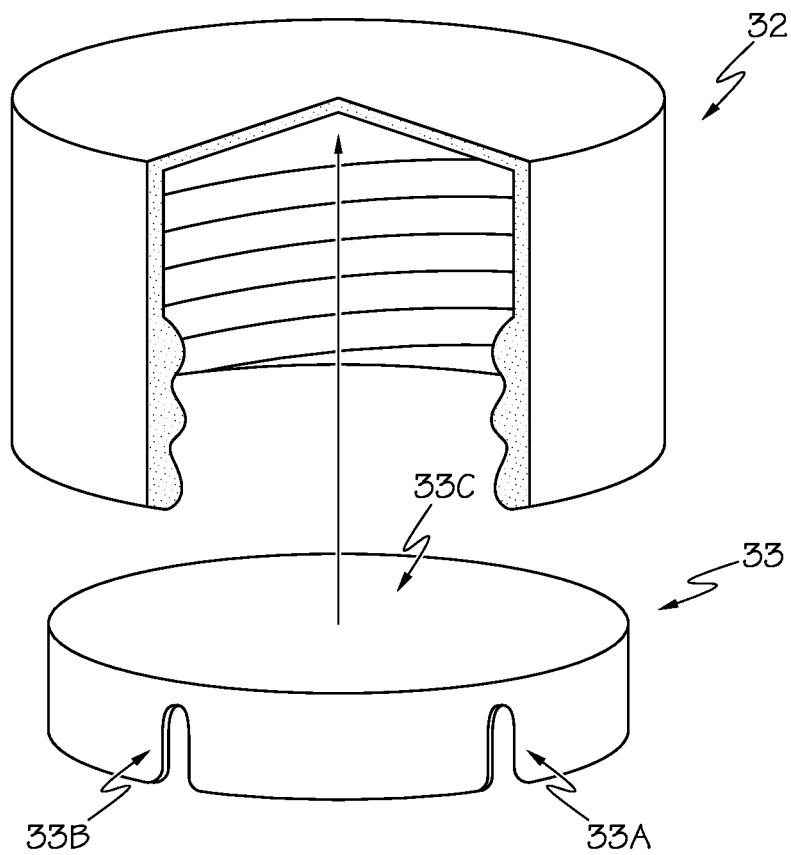
FIG. 5 depicts an expanded view of a pulp cap with a liner to provide a seal for the containment, according to aspects described herein.
Figure 5:
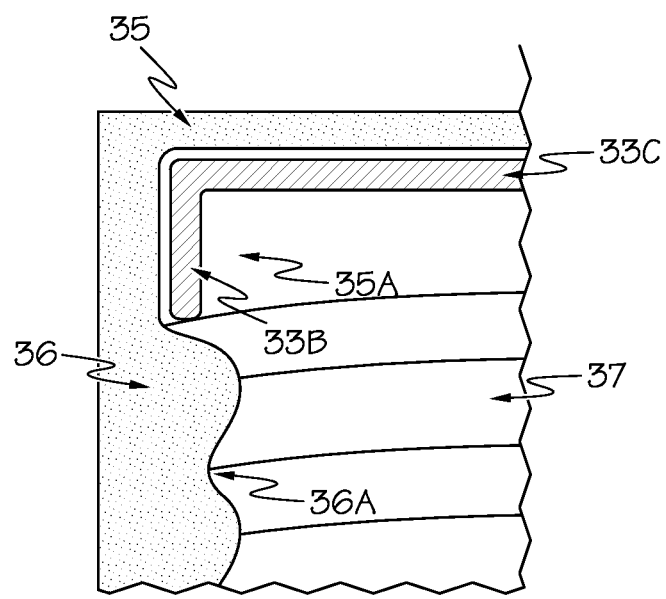

With respect to a cap 32 that pops off, this can be preformed or molded of a pulp material. As seen in FIG. 5, the cap 32 features an opening 37 to receive the neck 50 (not shown) and a closed end 35 to seal the containment. The wall 36 of the cap 32 may further feature variations in thickness as illustrated in FIG. 5. For example, toward the closed end 35, the wall 36 is narrowed to allow for a larger recess to receive the lid liner 33. The lid liner 33 can pass through the opening 37 which is narrower in diameter due to the lid liner 33 featuring notches 33A along a length to form a side wall 33B and a roof 33C. The side wall 33B can fold inward as the lid liner 33 moves from the opening 37, along the wall 36 and to the recess 35A at the closed end 35 of the cap 32. The side wall 33B can further expand in the recess 35A when the length of the notches 33A are equal to or shorter than the depth of the recess 35A at the closed end 35. The roof 33C is flush against the inside of the closed end 35. Those skilled in the art will appreciate that expansion of the side wall 33B in the recess 35A at the closed end 35 allows for retention of the lid liner 33 within the cap 32.

As also depicted in FIG. 5, the wall 36 of the cap 32 can varying in thickness at the opening 37 to provide curves 36A as the wall 36 approaches the recess 35A toward the closed end 35. The curves are intended to allow the cap 32 to grip an exterior thread (not explicitly depicted in FIG. 5) of the neck 50.

Those skilled in the art will appreciate that the lid liner 33 can be preinserted into the cap 32 or can be later forced into the recess 35A through the act of closing the containment.

The containment may be assembled in the following manner: the two essentially semi-cylindrical halves 20A, 20B can be preformed or molded and then positioned to receive an adhesive or sealant along the trough lengths 22A, 22B, 22C and/or along the apex of the raised ridge lengths 21A, 21B, 21C. Adhesive or sealant may be applied to the vertical rim 41 or within the indenture 34 of the neck 50. The neck can then be placed onto one half the two essentially semi-cylindrical halves 20A by engaging the vertical rim 41 with the indenture 34. The second essentially identical semi-cylindrical half 20B can then be attached by aligning the trough lengths 22A, 22B, 22C from 20A with the raised ridge lengths 21A, 21B, 21C on 20B and vice versa. The vertical rim 41 of 20B is also engaged with the indenture 34 of the neck 50 to complete the assembly.

Examples

Table 1 below shows example carrier layer compositions. Table 2 below shows example compositions used to form the carrier layer and the nanomaterial layer or a pre-layered film or liquid mixture including the carrier and nanomaterial layers.

TABLE 1

| Ex. | Biopolymer | Solvent |
|---|---|---|
| 1 | PHA | DCM |
| 2 | PBS | DCM |
| 3 | lignin | DCM |
| 4 | PHA and PBS | DCM |
| 5 | PHA and lignin | DCM |
| 6 | PBS and lignin | DCM |
| 7 | PHA, PBS, and lignin | DCM |
| 8 | PHA | DCMS |
| 9 | PBS | DCMS |
| 10 | lignin | DCMS |
| 11 | PHA and PBS | DCMS |
| 12 | PHA and lignin | DCMS |
| 13 | PBS and lignin | DCMS |
| 14 | PHA, PBS, and lignin | DCMS |
| 15 | PHA | hydrofluoroether |
| 16 | PBS | hydrofluoroether |
| 17 | lignin | hydrofluoroether |
| 18 | PHA and PBS | hydrofluoroether |
| 19 | PHA and lignin | hydrofluoroether |
| 20 | PBS and lignin | hydrofluoroether |
| 21 | PHA, PBS, and lignin | hydrofluoroether |
| 22 | PHA | DCM and DCMS |
| 23 | PBS | DCM and DCMS |
| 24 | lignin | DCM and DCMS |
| 25 | PHA and PBS | DCM and DCMS |
| 26 | PHA and lignin | DCM and DCMS |
| 27 | PBS and lignin | DCM and DCMS |
| 28 | PHA, PBS, and lignin | DCM and DCMS |
| 29 | PHA | DCM and hydrofluoroether |
| 30 | PBS | DCM and hydrofluoroether |
| 31 | lignin | DCM and hydrofluoroether |
| 32 | PHA and PBS | DCM and hydrofluoroether |
| 33 | PHA and lignin | DCM and hydrofluoroether |
| 34 | PBS and lignin | DCM and hydrofluoroether |
| 35 | PHA, PBS, and lignin | DCM and hydrofluoroether |
| 36 | PHA | DCMS and hydrofluoroether |
| 37 | PBS | DCMS and hydrofluoroether |
| 38 | lignin | DCMS and hydrofluoroether |
| 39 | PHA and PBS | DCMS and hydrofluoroether |
| 40 | PHA and lignin | DCMS and hydrofluoroether |
| 41 | PBS and lignin | DCMS and hydrofluoroether |
| 42 | PHA, PBS, and lignin | DCMS and hydrofluoroether |
| 43 | PHA | DCM, DCMS, and hydrofluoroether |
| 44 | PBS | DCM, DCMS, and hydrofluoroether |
| 45 | lignin | DCM, DCMS, and hydrofluoroether |
| 46 | PHA and PBS | DCM, DCMS, and hydrofluoroether |
| 47 | PHA and lignin | DCM, DCMS, and hydrofluoroether |
| 48 | PBS and lignin | DCM, DCMS, and hydrofluoroether |
| 49 | PHA, PBS, and lignin | DCM, DCMS, and hydrofluoroether |

TABLE 2

| Ex. | Biopolymer | Solvent | Nanoparticles |
|---|---|---|---|
| 50 | PHA | DCMS | silicon dioxide |
| 51 | PHA | DCM and DCMS | silicon dioxide |
| 52 | PBS | DCMS | silicon dioxide |
| 53 | PBS | DCM and DCMS | silicon dioxide |
| 54 | lignin | DCMS | silicon dioxide |
| 55 | lignin | DCM and DCMS | silicon dioxide |
| 56 | PHA and PBS | DCMS | silicon dioxide |

TABLE 2-continued

| Ex. | Biopolymer | Solvent | Nanoparticles |
|---|---|---|---|
| 57 | PHA and PBS | DCM and DCMS | silicon dioxide |
| 58 | PHA and lignin | DCMS | silicon dioxide |
| 59 | PHA and lignin | DCM and DCMS | silicon dioxide |
| 60 | PBS and lignin | DCMS | silicon dioxide |
| 61 | PBS and lignin | DCM and DCMS | silicon dioxide |
| 62 | PHA, PBS, and lignin | DCMS | silicon dioxide |
| 63 | PHA, PBS, and lignin | DCM and DCMS | silicon dioxide |
| 64 | PHA | DCMS | zinc oxide |
| 65 | PHA | DCM and DCMS | zinc oxide |
| 66 | PBS | DCMS | zinc oxide |
| 67 | PBS | DCM and DCMS | zinc oxide |
| 68 | lignin | DCMS | zinc oxide |
| 69 | lignin | DCM and DCMS | zinc oxide |
| 70 | PHA and PBS | DCMS | zinc oxide |
| 71 | PHA and PBS | DCM and DCMS | zinc oxide |
| 72 | PHA and lignin | DCMS | zinc oxide |
| 73 | PHA and lignin | DCM and DCMS | zinc oxide |
| 74 | PBS and lignin | DCMS | zinc oxide |
| 75 | PBS and lignin | DCM and DCMS | zinc oxide |
| 76 | PHA, PBS, and lignin | DCMS | zinc oxide |
| 77 | PHA, PBS, and lignin | DCM and DCMS | zinc oxide |
| 78 | PHA | DCMS | silicon dioxide and zinc oxide |
| 79 | PHA | DCM and DCMS | silicon dioxide and zinc oxide |
| 80 | PBS | DCMS | silicon dioxide and zinc oxide |
| 81 | PBS | DCM and DCMS | silicon dioxide and zinc oxide |
| 82 | lignin | DCMS | silicon dioxide and zinc oxide |
| 83 | lignin | DCM and DCMS | silicon dioxide and zinc oxide |
| 84 | PHA and PBS | DCMS | silicon dioxide and zinc oxide |
| 85 | PHA and PBS | DCM and DCMS | silicon dioxide and zinc oxide |
| 86 | PHA and lignin | DCMS | silicon dioxide and zinc oxide |
| 87 | PHA and lignin | DCM and DCMS | silicon dioxide and zinc oxide |
| 88 | PBS and lignin | DCMS | silicon dioxide and zinc oxide |
| 89 | PBS and lignin | DCM and DCMS | silicon dioxide and zinc oxide |
| 90 | PHA, PBS, and lignin | DCMS | silicon dioxide and zinc oxide |
| 91 | PHA, PBS, and lignin | DCM and DCMS | silicon dioxide and zinc oxide |
| 92 | PHA | hydrofluoroether | silicon dioxide |
| 93 | PBS | hydrofluoroether | silicon dioxide |
| 94 | lignin | hydrofluoroether | silicon dioxide |
| 95 | PHA and PBS | hydrofluoroether | silicon dioxide |
| 96 | PHA and lignin | hydrofluoroether | silicon dioxide |
| 97 | PBS and lignin | hydrofluoroether | silicon dioxide |
| 98 | PHA, PBS, and lignin | hydrofluoroether | silicon dioxide |
| 99 | PHA | hydrofluoroether | zinc oxide |
| 100 | PBS | hydrofluoroether | zinc oxide |
| 101 | lignin | hydrofluoroether | zinc oxide |
| 102 | PHA and PBS | hydrofluoroether | zinc oxide |
| 103 | PHA and lignin | hydrofluoroether | zinc oxide |
| 104 | PBS and lignin | hydrofluoroether | zinc oxide |
| 105 | PHA, PBS, and lignin | hydrofluoroether | zinc oxide |
| 106 | PHA | hydrofluoroether | silicon dioxide and zinc oxide |
| 107 | PBS | hydrofluoroether | silicon dioxide and zinc oxide |
| 108 | lignin | hydrofluoroether | silicon dioxide and zinc oxide |
| 109 | PHA and PBS | hydrofluoroether | silicon dioxide and zinc oxide |
| 110 | PHA and lignin | hydrofluoroether | silicon dioxide and zinc oxide |
| 111 | PBS and lignin | hydrofluoroether | silicon dioxide and zinc oxide |
| 112 | PHA, PBS, and lignin | hydrofluoroether | silicon dioxide and zinc oxide |
| 113 | PHA | DCM and hydrofluoroether | silicon dioxide |
| 114 | PBS | DCM and hydrofluoroether | silicon dioxide |
| 115 | lignin | DCM and hydrofluoroether | silicon dioxide |
| 116 | PHA and PBS | DCM and hydrofluoroether | silicon dioxide |
| 117 | PHA and lignin | DCM and hydrofluoroether | silicon dioxide |
| 118 | PBS and lignin | DCM and hydrofluoroether | silicon dioxide |
| 119 | PHA, PBS, and lignin | DCM and hydrofluoroether | silicon dioxide |
| 120 | PHA | DCM and hydrofluoroether | zinc oxide |
| 121 | PBS | DCM and hydrofluoroether | zinc oxide |
| 122 | lignin | DCM and hydrofluoroether | zinc oxide |
| 123 | PHA and PBS | DCM and hydrofluoroether | zinc oxide |
| 124 | PHA and lignin | DCM and hydrofluoroether | zinc oxide |
| 125 | PBS and lignin | DCM and hydrofluoroether | zinc oxide |
| 126 | PHA, PBS, and lignin | DCM and hydrofluoroether | zinc oxide |
| 127 | PHA | DCM and hydrofluoroether | silicon dioxide and zinc oxide |
| 128 | PBS | DCM and hydrofluoroether | silicon dioxide and zinc oxide |
| 129 | lignin | DCM and hydrofluoroether | silicon dioxide and zinc oxide |
| 130 | PHA and PBS | DCM and hydrofluoroether | silicon dioxide and zinc oxide |
| 131 | PHA and lignin | DCM and hydrofluoroether | silicon dioxide and zinc oxide |
| 132 | PBS and lignin | DCM and hydrofluoroether | silicon dioxide and zinc oxide |
| 133 | PHA, PBS, and lignin | DCM and hydrofluoroether | silicon dioxide and zinc oxide |
| 134 | PHA | DCMS and hydrofluoroether | silicon dioxide |
| 135 | PBS | DCMS and hydrofluoroether | silicon dioxide |
| 136 | lignin | DCMS and hydrofluoroether | silicon dioxide |
| 137 | PHA and PBS | DCMS and hydrofluoroether | silicon dioxide |
| 138 | PHA and lignin | DCMS and hydrofluoroether | silicon dioxide |
| 139 | PBS and lignin | DCMS and hydrofluoroether | silicon dioxide |
| 140 | PHA, PBS, and lignin | DCMS and hydrofluoroether | silicon dioxide |
| 141 | PHA | DCMS and hydrofluoroether | zinc oxide |
| 142 | PBS | DCMS and hydrofluoroether | zinc oxide |
| 143 | lignin | DCMS and hydrofluoroether | zinc oxide |
| 144 | PHA and PBS | DCMS and hydrofluoroether | zinc oxide |
| 145 | PHA and lignin | DCMS and hydrofluoroether | zinc oxide |
| 146 | PBS and lignin | DCMS and hydrofluoroether | zinc oxide |
| 147 | PHA, PBS, and lignin | DCMS and hydrofluoroether | zinc oxide |
| 148 | PHA | DCMS and hydrofluoroether | silicon dioxide and zinc oxide |
| 149 | PBS | DCMS and hydrofluoroether | silicon dioxide and zinc oxide |
| 150 | lignin | DCMS and hydrofluoroether | silicon dioxide and zinc oxide |
| 151 | PHA and PBS | DCMS and hydrofluoroether | silicon dioxide and zinc oxide |
| 152 | PHA and lignin | DCMS and hydrofluoroether | silicon dioxide and zinc oxide |
| 153 | PBS and lignin | DCMS and hydrofluoroether | silicon dioxide and zinc oxide |
| 154 | PHA, PBS, and lignin | DCMS and hydrofluoroether | silicon dioxide and zinc oxide |
| 155 | PHA | DCM, DCMS, and hydrofluoroether | silicon dioxide |
| 156 | PBS | DCM, DCMS, and hydrofluoroether | silicon dioxide |
| 157 | lignin | DCM, DCMS, and hydrofluoroether | silicon dioxide |
| 158 | PHA and PBS | DCM, DCMS, and hydrofluoroether | silicon dioxide |
| 159 | PHA and lignin | DCM, DCMS, and hydrofluoroether | silicon dioxide |
| 170 | PBS and lignin | DCM, DCMS, and hydrofluoroether | silicon dioxide |

TABLE 2-continued

| Ex. | Biopolymer | Solvent | Nanoparticles |
|---|---|---|---|
| 171 | PHA, PBS, and lignin | DCM, DCMS, and hydrofluoroether | silicon dioxide |
| 172 | PHA | DCM, DCMS, and hydrofluoroether | zinc oxide |
| 173 | PBS | DCM, DCMS, and hydrofluoroether | zinc oxide |
| 174 | lignin | DCM, DCMS, and hydrofluoroether | zinc oxide |
| 175 | PHA and PBS | DCM, DCMS, and hydrofluoroether | zinc oxide |
| 176 | PHA and lignin | DCM, DCMS, and hydrofluoroether | zinc oxide |
| 177 | PBS and lignin | DCM, DCMS, and hydrofluoroether | zinc oxide |
| 178 | PHA, PBS, and lignin | DCM, DCMS, and hydrofluoroether | zinc oxide |
| 179 | PHA | DCM, DCMS, and hydrofluoroether | silicon dioxide and zinc oxide |
| 180 | PBS | DCM, DCMS, and hydrofluoroether | silicon dioxide and zinc oxide |
| 181 | lignin | DCM, DCMS, and hydrofluoroether | silicon dioxide and zinc oxide |
| 182 | PHA and PBS | DCM, DCMS, and hydrofluoroether | silicon dioxide and zinc oxide |
| 183 | PHA and lignin | DCM, DCMS, and hydrofluoroether | silicon dioxide and zinc oxide |
| 184 | PBS and lignin | DCM, DCMS, and hydrofluoroether | silicon dioxide and zinc oxide |
| 185 | PHA, PBS, and lignin | DCM, DCMS, and hydrofluoroether | silicon dioxide and zinc oxide |

As illustrated above, various aspects of features for a degradable containment are disclosed. While particular aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the aspects shown and described herein.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

We claim:

1. A containment comprising an internal space and first and second essentially identical semi-cylindrical parts each comprised of a curved body and a first length edge and a second length edge and a cap, wherein the first length edge comprises a raised ridge extending along the first length edge and the second length edge comprises a trough extending along the second length edge, the second length edge being positioned opposite the first length edge and further wherein the trough is essentially a relief of the raised ridge within the second length edge and further wherein the two essentially identical semi-cylindrical halves are joined to form an internal seal and form the internal space of the containment by placing the raised ridge and trough of the first semi-cylindrical part in the trough and raised ridge of the second semi-cylindrical part and wherein the cap comprises an opening to receive a proximal end of the containment, a closed end, and a cylindrical wall, wherein the cylindrical wall connect the opening and the closed end and further wherein the cylindrical wall thickness narrows toward the closed end to provide a recess.

2. The containment of claim 1, further an adhesive and or a sealant in the trough.

3. The containment of claim 1, wherein the first and the second semi-cylindrical parts further comprise a semi-circular distal end positioned such that a circular flat bottom is formed.

4. The containment of claim 3, wherein a raised ridge extends along a portion of the diameter of the semi-circular distal end of the first semi-cylindrical half and a trough extends along a portion of the diameter of the semi-circular distal end of the second semi-cylindrical part.

5. The containment of claim 1, wherein the first length edge comprises at least two raised ridges.

6. The containment of claim 1, wherein the first length edge further comprises a trough that extends along a second portion of the first length edge.

7. The containment of claim 1, wherein the cap further comprises a lid liner inserted into the recess, the lid liner comprising notched sidewalls and a roof, wherein the roof is flush against the closed end.

8. The containment of claim 1, wherein the cap further comprises curved ridges around the interior circumference of the cylindrical wall.

9. The containment of claim 1, wherein the first and second essentially identical semi-cylindrical parts are comprised of a pulp material.

10. The containment of claim 1, wherein the containment further comprises an internal liner.

11. The containment of claim 10, wherein the internal liner comprises a biopolymer of polyhydroxyalkanoate, (PHA) polybutylene succinate (PBS), lignin, or a mixture of two or more thereof.

12. The containment of claim 11, wherein the biopolymer has been dispersed in a solvent, the solvent including dichloromethane, dichlorodimethylsilane, hydrofluoroether, or a mixture of two or more thereof.

13. The containment of claim 11, wherein the internal liner further comprises nanoparticles selected from the group consisting of hydrophobic nanoparticles, silicone dioxide nanoparticles, zinc oxide nanoparticles or a combination thereof.

14. A method of preparing the containment of claim 1, comprising:
preforming two essentially identical semi-cylindrical parts, each comprised of a curved body and a first length edge and a second length edge, wherein the first length edge comprises a raised ridge extending along the first length edge and the second length edge comprises a trough within the second length edge and extending along the second length edge, the second length edge being positioned opposite the first length edge;
aligning the first length edge of the first semi-cylindrical part with the second length edge of the second semi-cylindrical part and the second length edge of the first semi-cylindrical part with the first length edge of the second semi-cylindrical part;

inserting the raised ridge on the first length edge into the trough on the second length edge to form an internal seal and form an internal space of the containment; and placing the cap on an opening to the internal space of the containment.

15. The method of claim 14, further comprising including an adhesive or sealant in the trough of the second length edge.

16. The method of claim 15, wherein the first and the second semi-cylindrical parts further comprise a semi-circular distal end portion to provide a circular bottom following alignment.

17. The method of claim 14, further comprising inserting an internal layer in the containment, wherein the internal layer comprises a biopolymer.

18. The method of claim 17, wherein the internal layer is inserted by applying a solvent with the biopolymer dispersed therein to surfaces within the containment.

* * * * *

UNITED STATES PATENT AND TRADEMARK OFFICE
CERTIFICATE OF CORRECTION

| | | |
|---|---|---|
| PATENT NO. | : 12,162,660 B1 | Page 1 of 1 |
| APPLICATION NO. | : 17/326824 | |
| DATED | : December 10, 2024 | |
| INVENTOR(S) | : Daniel G. Doster and Jim F. Warner | |

It is certified that error appears in the above-identified patent and that said Letters Patent is hereby corrected as shown below:

On the Title Page

Column 2, item (57), abstract, Line(s) 3, before "linked", insert --are--.

In the Specification

In Column 1, Line(s) 52, delete "parts" and insert --part--, therefor.

In Column 2, Line(s) 55, delete "polyhydroxyalkanoate, (PHA)" and insert --polyhydroxyalkanoate (PHA),--, therefor.

In Column 6, Line(s) 19, delete "From" and insert --from--, therefor.

In Column 6, Line(s) 35, delete "lengths 21C can extend of" and insert --length 21C can extend or--, therefor.

In the Claims

In Column 12, Line(s) 12, Claim 2, after "further", insert --comprising--.

In Column 12, Line(s) 42 & 43, Claim 11, delete "polyhydroxyalkanoate, (PHA)" and insert --polyhydroxyalkanoate (PHA),--, therefor.

Signed and Sealed this
Fourth Day of February, 2025

Coke Morgan Stewart
*Acting Director of the United States Patent and Trademark Office*